Nov. 17, 1942.  A. H. JONES  2,302,224
MEANS AND METHOD OF TREATING OIL
Filed Aug. 7, 1939
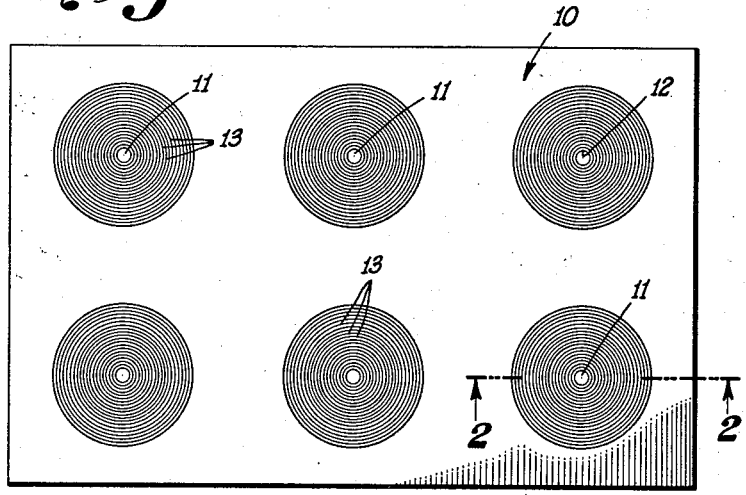
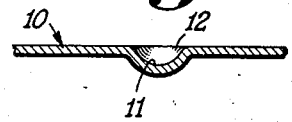
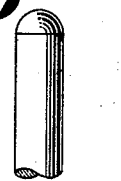
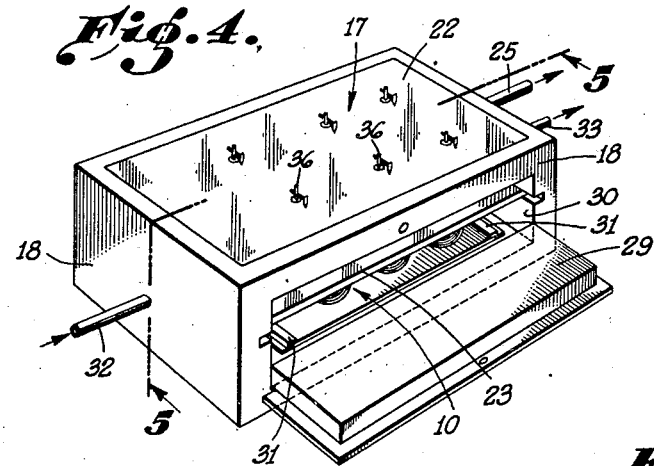
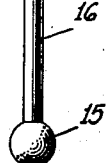
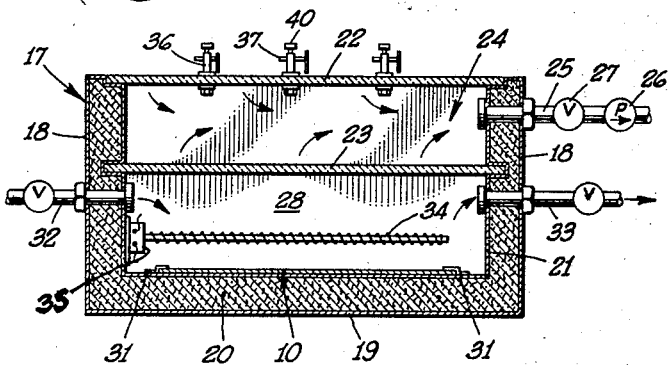
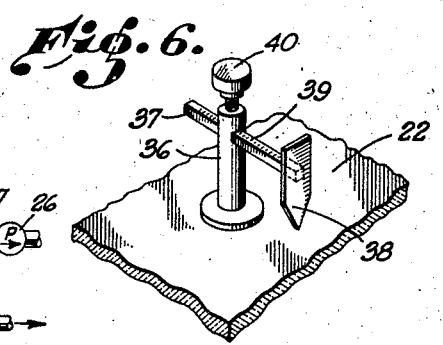
INVENTOR.
Alexander Houston Jones
BY Joseph F. Westall
ATTORNEY.

UNITED STATES PATENT OFFICE 2,302,224

MEANS AND METHOD OF TESTING OIL

Alexander Houston Jones, Glendale, Calif., assignor of one-tenth to Harry C. Vandewater, Glendale, Calif.

Application August 7, 1939, Serial No. 288,773

8 Claims. (Cl. 73—51)

This invention relates to means and methods of testing oils to establish the viscosity, and gasoline or other solvent content of a quantity of oil, and, further, to segregate solid particles carried in suspension by the oil tested. The method and apparatus hereof is of particular utility in analyzing crank case oil of internal combustion engines for the primary purpose of determining the condition of the engine and lubricating value of the oil.

It has been found that by an analysis of the oils employed in internal combustion motors over a considerable period of time, a fairly accurate account of the operating condition of the engine can be obtained. Changes occurring over a period of time in the viscosity of oil in an engine will inform the operator of the efficiency of the oil at the time. An analysis of a sample taken from the crank case will indicate the gasoline content of the oil, from which the condition of bearings, pistons, cylinders, and rings may be appraised. By further analysis of the constituents of the matter carried by the oil in suspension, the wear of certain parts and the efficiency of the lubricating system may be determined.

Prior art methods of conducting these various examinations are costly and for that reason have in many cases been foregone.

It is a general object of the present invention to provide inexpensive and simple methods whereby the viscosity and dilution of an oil sample may be determined with a minimum of effort, while simultaneously accumulating solid particles carried by the oil for subsequent separate examination.

Another and more specific object is to provide a sheet or card, composed of paper, cardboard or the like, adapted to absorb a quantity of oil placed thereon for analysis, throughout an area of the sheet or card at a uniform rate, depending upon the viscosity of the oil, and incorporating means to circularize such deposit of oil on said sheet or card.

Another object is to provide a device for forming successive oil drops to be tested of predetermined uniform weight for deposition on the testing card.

Another object is to provide apparatus comprising a cabinet for producing artificial temperatures and/or pressures in which the test may be conducted, incorporating means for the further treatment of the oil sample simultaneously with its spread through the oil absorbing medium by a gas having an oxidizing, neutralizing, reducing, or corrosive effect on the oil.

Still another object is the provision of a series of indicators mounted on top of the cabinet above alluded to, whereby the spread of the oil through the absorbent card may be accurately determined without removing the card from the compartment.

Other objects and salient features such, for example, as economy of construction of the apparatus of my invention, and simplicity of the method whereby the observations to be made in conducting the test and conclusions to be drawn therefrom are rendered with the ability of laymen, will be apparent to those of skill in the art from an examination of the following description read in the light of the accompanying drawing, in which:

Fig. 1 is a plan view of one embodiment of an oil-absorbent card of my invention;

Fig. 2 is a broken sectional view taken on correspondingly numbered lines of Fig. 1;

Fig. 3 is an elevation of a novel dropper for measuring the oil sample to be tested;

Fig. 4 is a perspective view of a cabinet for the creation of artificial temperature and pressure conditions in which the testing card with a deposit of oil to be tested may be placed;

Fig. 5 is a sectional view taken on lines 5—5 of Fig. 4;

Fig. 6 is an enlarged view of one of the indicators mounted on top of the cabinet.

Referring to the drawing in detail, the numerals of which indicate similar parts throughout the several views, 10 designates a sheet of thin cardboard of uniform texture which is adapted to absorb oil at a rate corresponding to the viscosity of the oil. Any of various grades of cardboard may be employed, although the value of the board for this use will vary according to the uniformity of its thickness and texture. It has been found that cardboard known to the art as "pasted cardboard, translucent," which comprises two glazed surface sheets with a filtering material between, is particularly adapted for the purposes of my invention. It should be understood, however, that materials other than cardboard may be employed, as, for example, ground glass, asbestos, or any medium over or through which a drop of oil will spread at a rate according to the viscosity of the oil.

The cardboard sheet 10 is provided with a series of circular spaced indentations 11, each adapted to receive a drop of oil to be tested. The size of the indentation is slightly larger than sufficient to receive a drop of oil of predetermined quantity after the drop has been permitted to settle on the board, but before the oil is absorbed.

The diameter of the visibly fluent oil drop immediately formed after the oil is deposited in the indentation, as well as the length of time a portion of the oil remains above the surface of the card in fluent form, is of importance in determining the dilution of the oil sample, as hereinafter more specifically pointed out.

The absorption of the oil sample by the card begins immediately after its deposition. The rate of absorption may be determined by the spread of the oil circle visible on the card and is a measure of the viscosity of the oil. The portion 12 of the card forming the edge of the indentation tends to circularize the oil drop and distribute the oil evenly over the indented portion of the card before the oil spreads beyond the indentation. Around and concentric with each indentation 11, a series of rings 13 are printed or otherwise delineated on the card to indicate the spread of the oil, the time required for the particular oil to spread to the respective circles being the measure of the viscosity of the sample. The spacing and number of the rings 13 encircling a particular indentation which will be utilized in a particular test may depend on the type of oil to be tested and the texture of the sheet employed, as will be made obvious. The apparatus of the embodiment of my invention here described is adapted to test oils commonly employed in motor vehicle gasoline engines, i. e., having a viscosity of the order of from S. A. E. Nos. 10 to 60. The time required for a complete test of an oil of this character, conducted at room temperatures in accordance with my invention, is approximately twenty-four hours, although valuable information will be obtained at intervals during the test, and the entire test may be expedited as will be obvious from the following. The observations with respect to the spread of the oil through the card may be made at widely varying time intervals, depending largely upon the viscosity of the oil being tested, and accordingly, I have illustrated the rings as being equi-distantly spaced apart and as of lesser variation in diameter than is necessary in any single test in order to illustrate a card prepared to facilitate the making of observations incident to the analysis of any oils of the above-noted viscosity range.

In accordance with the method of my invention, a quantity of oil to be tested is thoroughly agitated, and then allowed to stand for a predetermined time, as, for example, twenty-four hours. A dropper 14 consisting of a rod round in cross-section composed of glass or other suitable material is then inserted into the upper portion of the settled oil and withdrawn with a sample of the lighter upper portion of the oil adhering thereto. The lower end of the rod is spherular as designated by the numeral 15 to accumulate oil gravitating from the upper portion of the rod. To retard the flow of the oil on the rod toward the spherule 15 and minimize the effect of the weight of the oil above the spherule on the size of the drop thus formed, the rod is provided with a shank 16 of reduced cross-section between the larger upper portion and the spherule 15. A single drop of oil is, accordingly, measured and deposited by permitting it to gravitate from the spherule into one of the indentations 11 of the card. The oil drop will immediately spread to form a "wet spot" of a diameter depending upon the viscosity of the oil. Immediately thereafter, the deposited sample will spread through the card to the edge 12 of the indentation which will circularize the spot as above noted. The first observation to be made is of the length of time required for the oil to spread through the card to the first circle 13 and thereafter similar observations are made when the oil spread reaches each of the larger circles. During the test, the "wet spot" will disappear, i. e., the entire drop will become absorbed by the card. The time at which this occurs will be of value in determining the gasoline content of the oil, as will be obvious from the following.

Notations of these periods of time are compared with similar notations, prepared in a like manner on another card or another testing area of the same card, of the time required for a drop of new oil of the same grade and manufacture to spread to the respective circles of its testing area, and to be absorbed by the card thereat, which will indicate the change in viscosity of the oil from which the sample was taken while in the motor. In order to facilitate a comparison of the analysis of the oil being tested with the new oil, a graph may be constructed by plotting the time in hours horizontally (abscissa) and the measured diameter of the spread of the oil circle at corresponding time periods, vertically (ordinate). The drying point may be recorded by a cross or dot on the part of the graph vertically above the hour at which the drying point was reached by that particular sample. A set of graphs showing the result of identical tests of different new oils may be printed and the curve of the results of a test of a used oil of the same grade and manufacture, but having an unknown viscosity to be determined, may be plotted thereon. To calculate the approximate dilution of the oil sample, three factors are noted: First, the more rapid absorption during the early hours of the test due to the effect on the viscosity by the gasoline present; second, the slower absorption towards the end of the test due largely to the evaporation of much of the lighter constituents of the oil sample during the test; and third, the time at which the diluted oil sample attains full absorption by the card.

Within the indentation there will accumulate the heavier solid particles carried by the oil sample which remains suspended in the quantity of oil from which the sample was taken from the body of the oil tested. The volume of the residue will indicate the total solids in the crank case oil, as well as the efficiency of the oil filter if one is employed in the lubricating system— due regard being given to the time the oil was run in the engine. A careful analysis by well known means of the constituents of the residue will further show the efficiency of the lubricating system and the general condition of the motor. For example, the residue may be found to contain graphite, wood dust, sludge, road dirt, and various metals. If cadmium particles were discovered in the residue, it would be apparent that the silver cadmium bearing was improperly lubricated and that attention should be given thereto.

A second test is made in the same manner at an adjacent indentation of the card after the oil batch from which the first oil sample drop was taken, has been thoroughly stirred, for a comparison of the volume of the residue accumulated in the two tests. Such a comparison will demonstrate the proportion of the solid matter in suspension of the oil which will not settle out and correspondingly, its detriment to the motor. Moreover, the tendency of the solid particles to settle will indicate whether filtration will be necessary in reclaiming the oil or whether it is worth reclaiming at all.

While it requires approximately twenty-four hours for a complete test, i. e., in order to ascertain both viscosity and dilution of the oil when conducted as above described, the test may be conducted more quickly by increasing the temperature of the oil on the card immediately after the oil drop is deposited in the indentation 11, due to the fact that the viscosity of the oil is affected by variations in temperature. For this purpose, a cabinet generally indicated by the numeral 17 (Figs. 4 and 5) is provided, having outer side walls 18 and a bottom 19 composed of a heat-resistant material. The sides and bottom of the cabinet are lined with an insulating material 20 such as asbestos or cork for the support of an inner inclosure 21. The top of the cabinet and inclosure are covered with a glass plate 22. A glass partition 23 divides inclosure 21 transversely to form an upper insulating chamber 24 from which a tube 25 extends through the wall of the inclosure 21 and wall 18 of cabinet 17. The tube 25 leads to a vacuum pump generally indicated by the numeral 26 exteriorly of the cabinet. A vacuum is drawn between the glass cover 22 and partition 23 by the pump and maintained by a valve 27 in the tube 25 for purposes of insulating the cover 22 from the heat which may be raised within the testing compartment 28 which is formed between the bottom of the inclosure and partition 23 by means about to be described. A door 29 (Fig. 4) is hinged to the cabinet to close an opening 30 registering with the testing compartment through which a testing card 10 carrying the oil sample may be inserted into compartment 28. The card slidably fits between guide rails 31 secured to the bottom of the inclosure so as to position each card successively placed in the cabinet in exactly the same position for a purpose later referred to. A valved inlet tube 32 extends through the cabinet and insulation into the testing compartment through which heated air or other gases adapted to reduce, neutralized, oxidize, or corrode, certain constituents of the oil sample on the card, may be admitted under pressure or partial vacuum. Circulation of these fluids may be maintained by the provision of a valved exit tube 33 communicating with the testing compartment. Tube 33 may be connected to the vacuum pump to facilitate the creation of a vacuum within the testing compartment if desired. As above noted, the compartment may be heated from an exterior source by pumping a heated gas therein through tube 32. However, an electrical heating element of conventional construction is also provided within the compartment comprising a resistance coil 34 connected through a thermostat 35 adapted to automatically control the operation thereof.

In order to measure the diameter of the circular spread of the oil through the card within the cabinet, I provide a series of indicators (Fig. 6) of identical construction mounted on the glass cover 22 of the cabinet in concentric alignment with each indentation of the card therebelow in the testing compartment. Each indicator comprises a stud 36 secured in an opening in the glass by suitable means. The stud is diametrically slotted for the slidable extension of a transverse arm 37. A sight 38 is secured rigidly to one end of arm 37 perpendicularly to the floor of the inclosure 21 on which the testing card is adapted to be supported. The upper edge of the arm is calibrated as at 39 to indicate the exact distance sight 38 is projected from the center of stud 36. A set screw 40 is threaded into the stud to secure the arm and sight in any adjusted position.

In the use of the cabinet, a drop of oil to be tested is deposited in the indentation of the card as above described, and the card immediately is inserted through the door of the cabinet into the testing compartment. The cabinet may then be heated to accelerate the spread of the oil. As above noted, various gases producing an oxidizing, neutralizing, corrosive, or reducing effect on constituents of the oil sample, may be introduced into the testing compartment of the cabinet to determine in a manner familiar to those of skill in the art, other qualities of the oil body from which the sample was taken.

The same observations may be made of the oil spot on the card within the compartment as above described when the test is conducted at room temperatures, by reason of the indicator mounted on the glass cover 22 in concentric alignment with the oil deposit. The arm of the indicator may be slidably adjusted in the slot of stud 36 to align sight 38 with the edge of the oil spot formed in the card. A notation of the radius of the oil circle as registered by the calibrations on the arm may then be compared with similar notes or graphs made during previous tests of various known oils to determine the characteristic of the particular sample tested.

It will be understood that the test of the unknown oils with which the results of the test of the oil of unknown viscosity to be determined is to be compared, should be conducted under the same conditions within the testing compartment of the cabinet as the test of the unknown oil.

What I claim and desire to secure by Letters Patent is:

1. In apparatus for testing oils, a sheet of material having a circular indentation therein to receive an oil drop, said sheet having an affinity for oil varying in proportion to the viscosity of the oil, and means to drop a measured quantity of oil into said indentation.

2. In apparatus for testing oils, a cabinet having a transparent top, a partition of transparent material dividing said cabinet and forming an insulating chamber between said top and partition, and a testing chamber below said partition, and means to draw a vacuum in said insulating chamber.

3. In apparatus for testing oils, a cabinet having a transparent top, a partition of transparent material dividing said cabinet and forming an insulating chamber between said top and partition, and a testing compartment below said partition, and a heating element within said testing compartment.

4. In apparatus for testing oils, a cabinet having a transparent top, a partition of transparent material dividing said cabinet and forming an insulating chamber between said top and partition and a testing compartment below said partition adapted to receive a card having a deposit of oil thereon, and inlet and outlet conduits connected to said testing compartment for the circulation of gases affecting various constituents of the oil deposit on said card.

5. In apparatus for testing oils, a cabinet forming a testing compartment having a transparent top, means to support a card having a deposit of oil to be tested thereon within said testing compartment with said oil deposit visible through said top, a measuring device mounted on said top comprising a support concentric with said oil deposit, a transverse arm slidably carried by said support and a sight at one end of said arm, said arm carrying indicia indicative of the radius of the oil spot on the card within said testing compartment upon alignment of the sight with the periphery of the oil spot.

6. A method of testing oils which comprises the steps of: depositing a drop of oil to be tested on a sheet of material on which oils of different viscosities will spread at rates varying in proportion to their viscosity, and observing the rate of spread of oil so deposited, depositing a plurality of separate drops of oil of different known viscosities but of volumes, respectively, equal to the volume of the drop to be tested on a sheet composed of material of the same composition, weight and texture as the first-mentioned sheet, measuring the rate of spread of said last-named oil drops on the sheet on which they are deposited, respectively, and comparing the rate of spread of the oil being tested with the rate of spread of the drops of oil of known viscosity to determine approximately the viscosity of the oil tested.

7. The method of determining the gasoline content and viscosity of oils comprising the steps of: depositing a drop of the oil to be tested on an absorbent card composed of a material through which oil will spread at a rate proportionate to its viscosity, depositing a plurality of drops of oils of different known viscosities, within the viscosity range of which it is adjudged the oils to be tested is included, on different areas of the card, each of said plurality of drops being of the same volume as the drop to be tested, and comparing the time required for the oil drop to be tested to spread through an area of the card with the time required for the drops of the known oils to spread through the same area of the card, to ascertain the approximate viscosity value of the oil being tested.

8. The method of determining the gasoline content and viscosity of oil comprising the steps of: depositing a drop of the oil to be tested on an absorbent card of a material through which the oil will spread at a rate proportionate to its viscosity, measuring at intervals the extent of the spread through the card of the oil deposited, for a comparison of the rapidity of the absorption by the card of the oil drop during the early periods of test with the rate of its spread through the card during the later periods of the test, and with similar observation made during an identical test of drops of oil of known and different viscosity within the viscosity range of which known oils, it is adjudged the oil to be tested is included.

ALEXANDER HOUSTON JONES.